United States Patent [19]

Bailey

[11] Patent Number: 4,654,280
[45] Date of Patent: Mar. 31, 1987

[54] NONAQUEOUS CELL EMPLOYING A CATHODE-ELECTROLYTE SOLUTION CONTAINING A BORON-CONTAINING ADDITIVE

[75] Inventor: John C. Bailey, Columbia Station, Ohio

[73] Assignee: Eveready Battery Company, St. Louis, Mo.

[21] Appl. No.: 892,458

[22] Filed: Aug. 4, 1986

Related U.S. Application Data

[63] Continuation of Ser. No. 686,734, Dec. 27, 1984, abandoned.

[51] Int. Cl.⁴ .............................................. H01M 6/14
[52] U.S. Cl. .................................... 429/194; 429/198; 429/199; 429/48
[58] Field of Search ............... 429/194, 196, 197, 199, 429/198, 48, 218

[56] References Cited

U.S. PATENT DOCUMENTS

| | | | |
|---|---|---|---|
| 3,726,716 | 4/1973 | Athearn | 429/194 |
| 3,993,501 | 11/1976 | Kalnoki-Kis | 429/48 |
| 4,020,240 | 4/1977 | Schlaikjer | 429/50 |
| 4,071,664 | 1/1978 | Dey | 429/194 |
| 4,218,523 | 8/1983 | Kalnoki-Kis | 429/101 |
| 4,228,229 | 10/1980 | Gabano et al. | 429/196 |
| 4,277,545 | 7/1981 | Kalnoki-Kis | 429/48 |
| 4,403,021 | 9/1983 | Domeniconi et al. | 429/101 |
| 4,416,960 | 11/1983 | Eustace et al. | 429/194 |
| 4,440,836 | 9/1983 | Bailey | 429/48 |

Primary Examiner—Anthony Skapara
Attorney, Agent, or Firm—Cornelius F. O'Brien; Virgil B. Hill

[57] ABSTRACT

A nonaqueous cell comprising an active metal anode, such as lithium, an ionically conductive cathode-electrolyte solution containing a solute dissolved in a liquid active cathode such as thionyl chloride, and wherein the cathode-electrolyte solution contains a boron-containing additive to alleviate initial voltage delay of the cell when discharged.

26 Claims, 8 Drawing Figures

NONAQUEOUS CELL EMPLOYING A CATHODE-ELECTROLYTE SOLUTION CONTAINING A BORON-CONTAINING ADDITIVE

This application is a continuation of prior U.S. application Ser. No. 686,734 Filing Date 12/27/84, now abandoned.

FIELD OF THE INVENTION

The invention relates to a nonaqueous cell employing an active metal anode, such as lithium, and a cathode-electrolyte solution comprising a solute dissolved in a liquid active cathode and wherein a boron-containing additive is incorporated in the cell to alleviate initial voltage delay.

BACKGROUND OF THE ART

The development of high energy battery systems requires, among other things, the compatibility of an electrolyte solution possessing desirable electrochemical properties with respect to highly reactive anode materials, such as lithium or the like. The use of aqueous electrolytes is precluded in these systems since the anode materials are sufficiently active to react with water chemically. It has, therefore, been necessary in order to realize the high energy density obtainable through use of these highly reactive anodes to turn to the investigation of nonaqueous electrolyte systems.

The term "nonaqueous electrolyte" as used herein refers to an electrolyte which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the inside front cover of the Handbook of Chemistry and Physics, 63rd Edition, CRC Press Inc., Boca Raton, Fla., 1982-1983.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has been disclosed in the literature that certain materials are capable of acting both as an electrolyte carrier, i.e., as solvent for the electrolyte salt, and as the active cathode for a nonaqueous electrochemical cell. U.S. Pat. Nos. 3,475,226, 3,567,515 and 3,578,500 each disclose that liquid sulfur dioxide or solutions of sulfur dioxide and a cosolvent will perform this dual function in nonaqueous electrochemical cells. While these solutions perform their dual function, they are not without several disadvantages in use. An amount of sulfur dioxide is always present and, being a gas at ordinary temperatures, it must be contained in the cell as a liquid under pressure or dissolved in a liquid solvent.

U.S. Pat. No. 4,400,453 discloses a nonaqueous electrochemical cell comprising an anode, a cathode collector and a cathode-electrolyte, said cathode-electrolyte comprising a solution of an ionically conductive solute dissolved in an active cathode (depolarizer) wherein said active cathode (depolarizer) consists of a liquid oxyhalide of an element of Group V or Group VI of the Periodic Table. Although oxyhalides can be used effectively as a component part of a cathode-electrolyte in conjunction with an active metal anode, such as a lithium anode, to produce a good high energy density cell, it has been observed that if the cell is stored for a period of about three days or longer, excessive passivation of the anode appears to occur which results in undesirable voltage delays at the beginning of discharge along with high cell impedance.

U.S. Pat. No. 3,993,501 discloses one approach for minimizing or preventing undesirable voltage delays at the beginning of discharge of nonaqueous cells employing an oxyhalide-containing cathode-electrolyte by providing a vinyl polymer film coating on the surface of the anode that contacts the cathode-electrolyte.

U.S. Pat. No. 4,218,523 discloses a nonaqueous cell comprising an active metal anode, such as lithium, a liquid cathode-electrolyte comprising a solute dissolved in a solvent which is an oxyhalide of an element of Group V or Group VI of the Periodic Table and wherein elemental sulfur or a sulfur compound is incorporated into the cathode-electrolyte so as to substantially eliminate initial voltage delay of the cell during discharge.

U.S. Pat. No. 4,277,545 discloses a nonaqueous cell utilizing an active metal anode, such as lithium, a cathode collector and an ionically conductive cathode-electrolyte comprising a solute dissolved in a liquid cathode, such as an oxyhalide, and wherein a vinyl polymer is dissolved in the cathode-electrolyte so as to substantially eliminate initial voltage delay of the cell during discharge.

U.S. Pat. No. 4,020,240 discloses an electrochemical cell employing an electrolyte salt containing a clovoborate anion structure which functions to retard anode passivation during long time storage even at elevated temperatures.

U.S. Pat. No. 4,071,664 discloses an electrochemical cell comprising an active metal anode and an electrolyte solvent/cathode depolarizer which reduces anode passivation during long time storage, even at elevated temperatures, by the inclusion of a minor proportion of an electrolyte salt additive having a clovoborate anion structure.

U.S. Pat. No. 4,228,229 discloses a nonaqueous lithium/oxyhalide cell in which the passivation of the lithium is effectively eliminated by employing a solute for the electrolyte solution which includes a complex salt resulting from the reaction of at least one ionizable compound with aluminum chloride, and wherein said ionizable compound comprises lithium sulphide $Li_2S$, lithium oxide $Li_2O$, calcium oxide $CaO$, or barium oxide $BaO$.

U.S. Pat. No. 4,440,836 discloses a nonaqueous cell employing an active metal anode, such as lithium, having a surface layer of a boron-containing material, a cathode and an electrolyte solution containing a solute dissolved in a nonaqueous solvent such as an oxyhalide in which case the oxyhalide also acts as the active cathode and whereby the surface layer of the boron-containing material reduces the initial voltage delay of said cell.

One of the objects of the present invention is to reduce the initial voltage delay of a nonaqueous cell employing a cathode-electrolyte solution comprising a solute dissolved in a liquid active cathode.

Another object of the present invention is to prevent the excessive passivation of an active metal anode in a liquid cathode-electrolyte cell by adding a boron-containing additive to the cell.

Another object of the present invention is to prevent the excessive passivation of an active metal anode in a liquid cathode-electrolyte cell by adding a boron-containing compound and a vinyl polymer to the cell, said boron-containing compound and vinyl polymer additives providing a synergistic effect in reducing the initial voltage delay of said cell.

Another object of the present invention is to provide an oxyhalide cathode-electrolyte cell system employing an active metal anode, such as lithium, with a boron-containing compound additive and a vinyl polymer additive to effectively prevent the excessive passivation of the active metal anode during cell storage and usage.

The foregoing and additional objects will become more fully apparent from the following description.

SUMMARY OF THE INVENTION

The invention relates to a nonaqueous cell employing an active anode and a cathode-electrolyte solution, said cathode-electrolyte solution comprising a solute dissolved in a liquid active cathode, the improvement wherein the cathode-electrolyte solution contains at least one additive selected from the group consisting of compounds of boron with elements from Periodic Group VIA and VIIA, and lithium boron compounds, in an amount sufficient to alleviate initial voltage delay of the cell when discharged.

The preferred amount of the boron-containing additive of this invention would be between about 0.01 mole and about 1.5 moles per liter of the cathode-electrolyte solution. More preferably, the amount of the additive would be between about 0.1 mole and about 1.0 mole and most preferably about 0.75 mole per liter of the cathode-electrolyte solution. An amount below 0.01 mole per liter of the cathode-electrolyte of the additive would be ineffective for most applications. An amount above 1.5 moles per liter of the cathode-electrolyte of the additive would reduce the amount of active material that would be placed in a fixed volume container.

Suitable boron compounds for use in this invention are compounds of boron with elements from Periodic Group VIA and VIIA such as $BCl_3$, $BBr_3$, $B_2S_3$ and $B_2O_3$, and lithium boron compounds such as $LiBO_2$, $Li_2B_4O_7$, $LiB_2$ and $LiB_{12}$.

It has been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid cathodes, such as the oxyhalides, inhibit the direct reaction of active metal anode surfaces sufficiently to permit them to act as both the cathode material and as the electrolyte solvent for nonaqueous cells, they do cause formation of a surface film on the active metal anode during cell storage, particularly at elevated temperatures, which consists of a rather heavy layer of crystalline material. This crystalline layer appears to cause excessive passivation of the anode which results in voltage delay on initial discharge.

The extent of anode passivation can be measured by observing the time required for the closed circuit voltage of the stored cell to reach its intended voltage level after discharge has begun. If this delay exceeds 20 seconds, the anode passivation would be considered excessive for most applications. What has been observed, for example, in lithium-oxyhalide cell systems is that after a load is applied across the terminals of the cell, the cell voltage immediately drops below the intended discharge level, then increases at a rate depending on temperature, the thickness of the crystalline layer, and the current density.

The exact composition of this layer is not know. The thickness and density of the crystalline layer as well as the size and shape of the crystals were observed to vary with the length of the storage period and also with the temperature during storage, e.g., at low temperatures there is relatively little growth of the crystalline layer as compared to the greater growth of the layer at higher temperatures of about 71° C.

U.S. Pat. No. 4,277,545 discloses that the initial voltage delay observed in lithium oxyhalide cells can be reduced by dissolving a vinyl polymer in the liquid oxyhalide. It has been observed that with the addition of a vinyl polymer to a cell up to 1.0 gram per liter of the cathode-electrolyte, the initial voltage delay time of the cell which had been stored at about 21° C. for one month, was reduced as compared to an identical cell that did not contain the vinyl polymer. Increasing the vinyl polymer about 1.0 gram per liter would not further reduce the initial voltage delay and instead would sacrifice cell capacity by occupying volume that could be used for the active materials of the cell. An amount of vinyl polymer below 0.05 gram per liter of the cathode electrolyte would not effectively reduce the initial delay voltage.

It has been discovered that by adding a boron-containing additive of the subject invention and a vinyl polymer to a lithium-oxyhalide cell, a synergistic effect was observed in the reduction of initial voltage delay after the cell was stored at an elevated temperature.

The vinyl polymer to be used in this invention must remain stable in the liquid cathode-electrolyte and not effectively decrease the capacity of the cell during cell storage and discharge and in most cases will even increase the cell output on high rate discharge compared to cells without the vinyl polymer.

The vinyl polymer can be added to the cell by applying a vinyl coating on the separator and/or anode and/or by dissolving the vinyl polymer in the cathode-electrolyte solution.

The vinyl polymeric materials suitable for use in accordance with this invention are normally solid vinyl polymers such as homopolymers of vinyl or vinylidene chloride, or copolymers containing vinyl chloride or vinylidene chloride having at least one of the following monomers copolymerized therein selected from the group consisting of vinyl esters, dibasic acids, diesters of dibasic acids and monoesters of dibasic acids. The term "copolymers" is used herein to mean mixed polymers or polyblends as well as heteropolymers formed from two or more unlike monomers polymerized together (reference: Concise Chemical and Technical Dictionary, 3rd Edition, H. Bennett, editor, Chemical Publishing Co., 1974).

General examples of suitable copolymers include combinations of vinyl chloride copolymerized with vinyl esters such as vinyl acetate and the like; vinyl chloride copolymerized with diesters of dibasic acids such as dibutyl maleate; vinyl chloride copolymerized with vinyl esters such as vinyl acetate and dibasic acids or mono- or diesters of dibasic acids such as maleic acid, or dibutyl- or monobutyl maleate. Specific examples are: a vinyl chloride-vinyl acetate copolymer containing 97% vinyl chloride—3% vinyl acetate; a vinyl chloride-vinyl acetate copolymer containing 86% vinyl chloride—14% vinyl acetate; a vinyl chloride-vinyl acetate-dibasic acid copolymer containing 86% vinyl chloride—13% vinyl acetate—1% maleic acid; and a vinyl chloride-vinyl acetate copolymer containing 90% vinyl chloride—10% vinyl acetate.

The preferred amount of the vinyl polymer would be at least 0.05 gram per liter of the cathode-electrolyte solution. More preferably, the amount of the vinyl polymer would be at least 0.075 gram per liter of the cathode-electrolyte solution and most preferably at least 0.25 gram per liter of the cathode electrolyte solution.

Suitable nonaqueous liquid cathode materials for use in cells employing this invention would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride and mixtures thereof.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are tetrahydrofuran, 1,3-dioxolane, 3-methyl-2-oxazolidone, propylene carbonate, gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

It is also within this invention to employ inorganic solvents such as liquid inorganic halides of elements from Groups IV, V and VI of the Periodic Table, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$), tin tribromide chloride ($SnBr_3Cl$), sulfur monochloride ($S_2Cl_2$), and sulfur dichloride ($SCl_2$). These halides, in addition to functioning as an electrolyte solvent in nonaqueous cells, can also function as an active reducible cathode thereby contributing to the overall active reducible material in such cells.

The anode for use in the cells of this invention can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using lithium anodes, the anode may be coated with a vinyl resin as disclosed in U.S. Pat. No. 3,993,501, said patent incorporated herein by reference.

A separator if used in this invention has to be chemically inert and insoluble in the liquid cathode-electrolyte and have a porosity so as to permit the liquid electrolyte to permeate through and contact the anode of the cell, thus establishing an ion transfer path between the anode and cathode. A suitable separator for use in this invention is nonwoven or woven glass fiber mat as disclosed in U.S. Pat. No. 4,421,834. However, the vinyl polymer could be incorporated into or onto the separator, if desired.

The solute for use in the cells suitable for this invention may be simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293–313 by G. N. Lewis).

The cathode collector for use in cells suitable for this invention has to be electronically conductive so as to permit external electrical contact to be made with the active cathode material and also provide extended area reaction sites for the cathode electrochemical process of the cell. Materials suitable for use as a cathode collector are carbon materials and metals, such as nickel, with acetylene black being preferable. In addition, the cathode collector when made of particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl polymers, acrylic polymers and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wet-proof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

The container of the battery could be made of stainless steel, iron, nickel, plastic, coated metals or some other suitable material.

Some preferred combinations of nonaqueous cathode materials and anodes would be as follows:
(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Preferably, the cells for use in this invention would be liquid oxyhalide cells using sulfuryl chloride, thionyl chloride or mixtures thereof with a lithium anode.

BRIEF DESCRIPTION OF THE DRAWINGS

The present invention will become more apparent from the following description thereof when considered together with the accompanying drawings.

EXAMPLE 1

A plurality of cell lots comprising 0.475 inch diameter by 1.64 inch high cells was produced each containing a lithium anode (about 1.3 ampere-hours) a porous carbon current collector, a nonwoven glass separator disposed between the anode and the cathode collector, and a cathode-electrolyte comprising 2.4 ml of 1.5M $LiAlCl_4$ in $SOCl_2$. The $SOCl_2$ cathode capacity was about 1.53 ampere hours thereby making the cell anode-limited. In some cell lots, $BCl_3$ was dissolved in the cathode-electrolyte in various amounts. In other cell lots, a vinyl polymer comprising polyvinyl chloride was dissolved in the cathode-electrolyte in various amounts. The specific vinyl polymer was obtained commercially from B. F. Goodrich. In other cell lots, both $BCl_3$ and the vinyl polymer were added to the cathode-electrolyte in various amounts. After sealing, the cells were then stored at about 21° C. or 71° C. for either two weeks or four weeks and then each cell was discharged across a 75-ohm load. The discharge voltage data were observed for each cell. Table 1 shows the various cell lots along with the amount of any additive incorporated in the cathode-electrolyte. Each lot consisted of three cells. The discharge voltage vs time curve for each cell in each lot was plotted and the data for lots 1 through 6 are shown plotted in FIGS. 1 through 6, respectively.

TABLE 1

Figure 1:
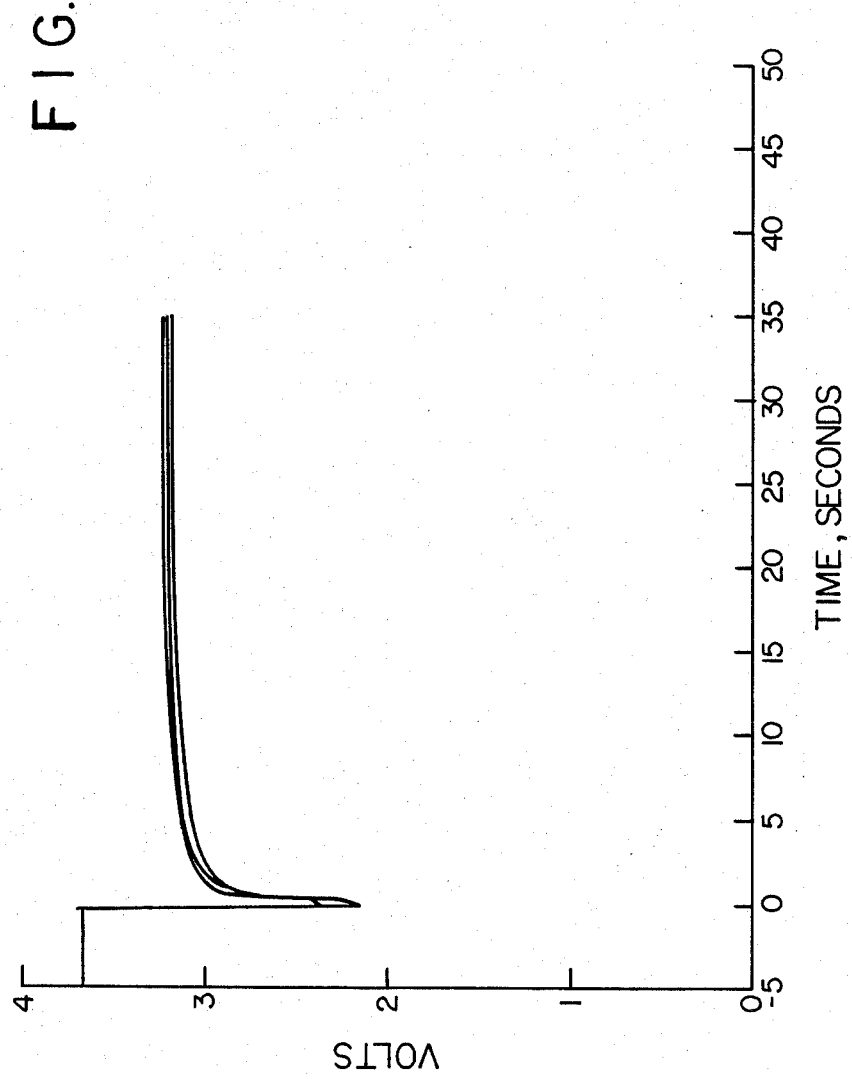
FIGS. 1 through 8 show discharge voltage vs time curves for nonaqueous lithium-thionyl chloride cells with or without a boron halide or boron sulfide compound and/or a vinyl polymer additive to the cell.
Figure 2:
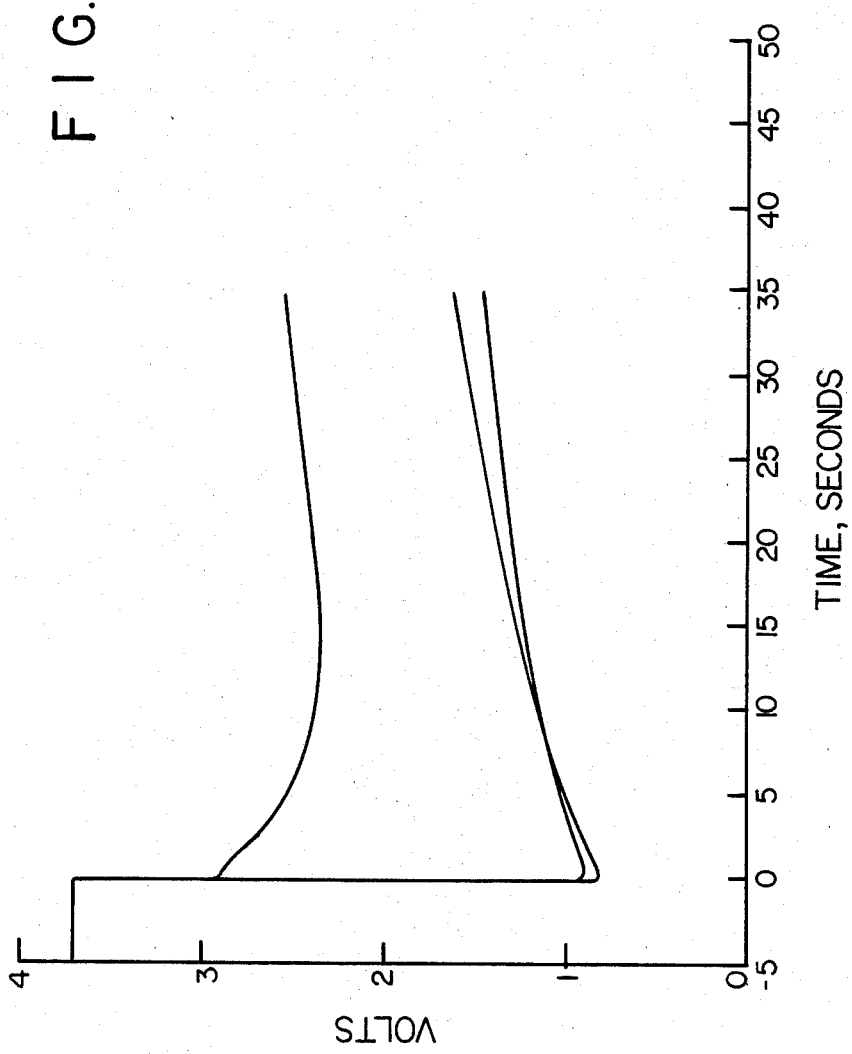
Figure 3:
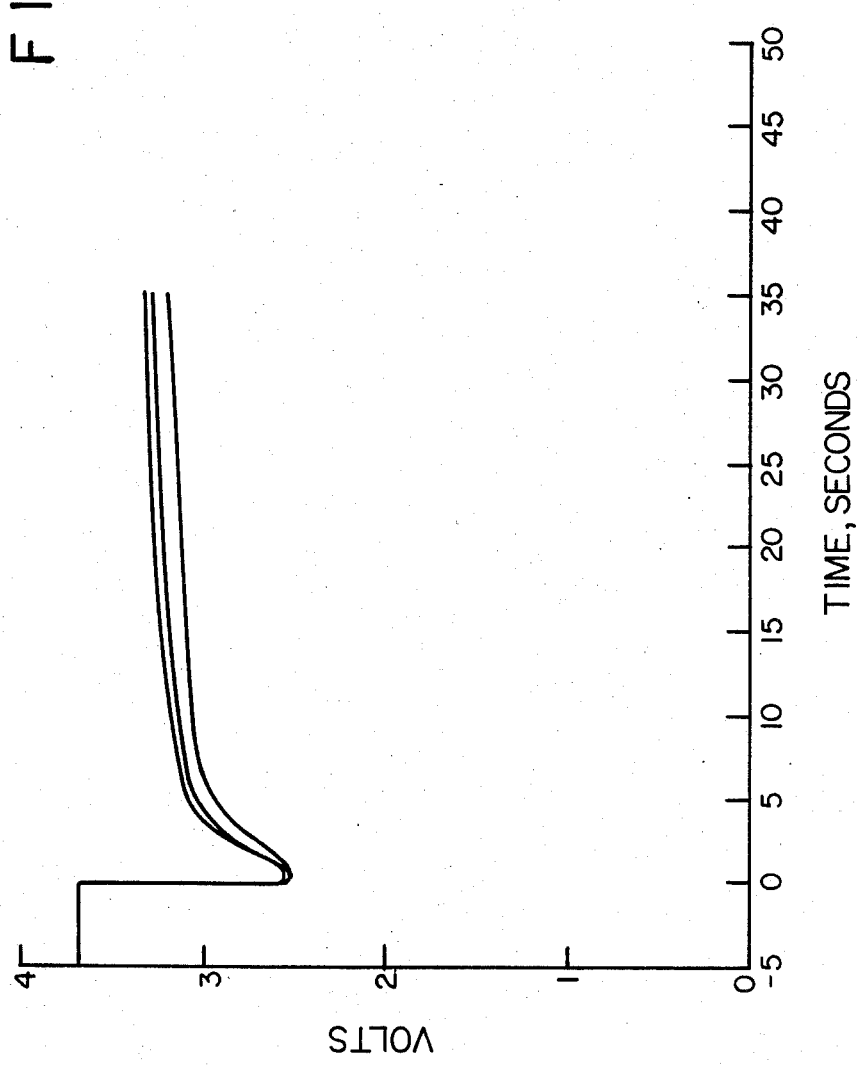
Figure 4:
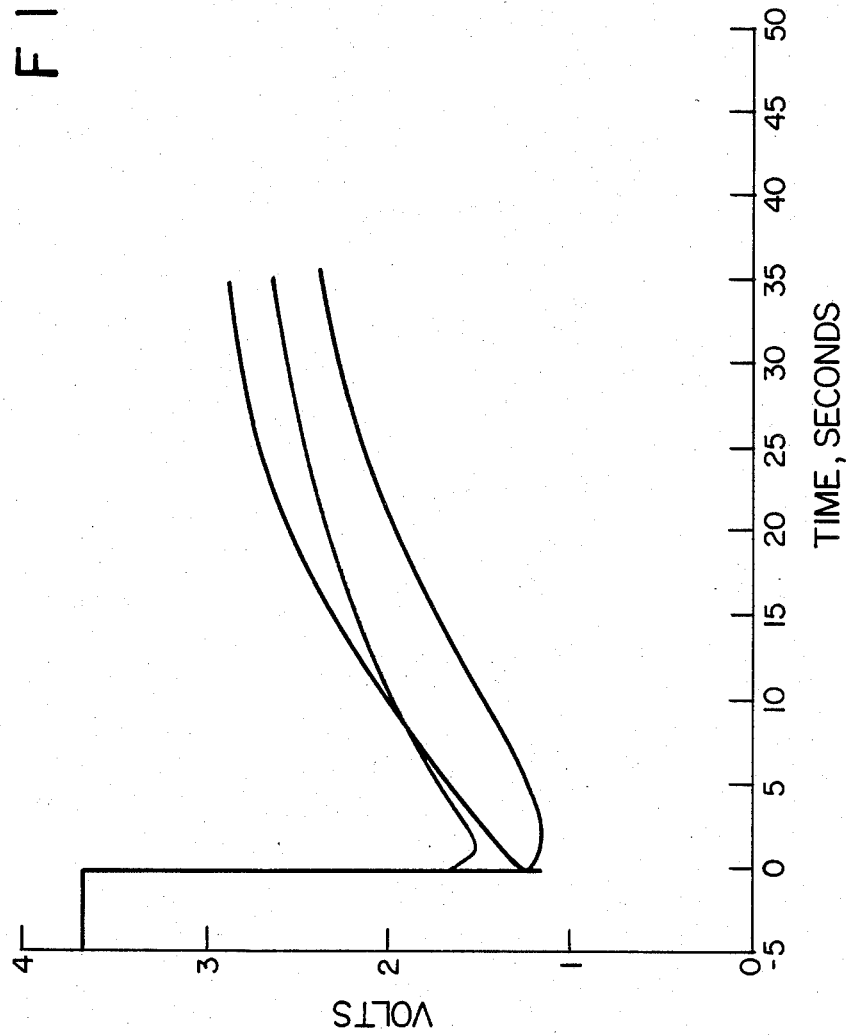
Figure 5:
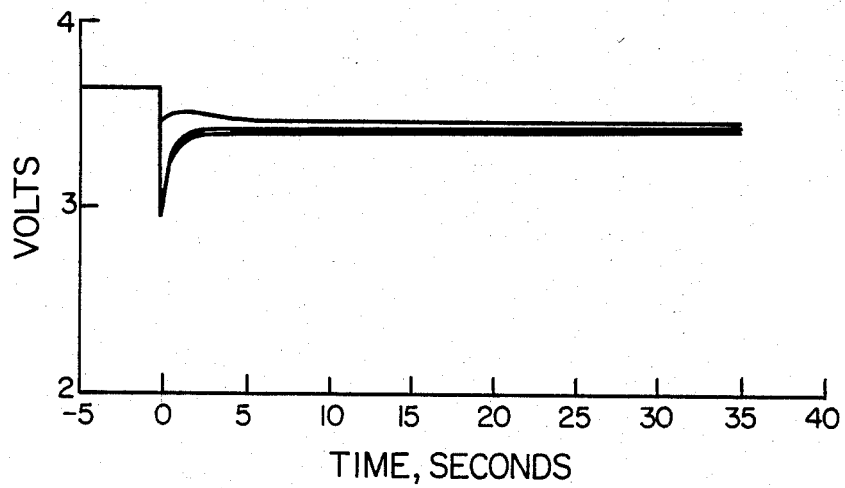
Figure 6:
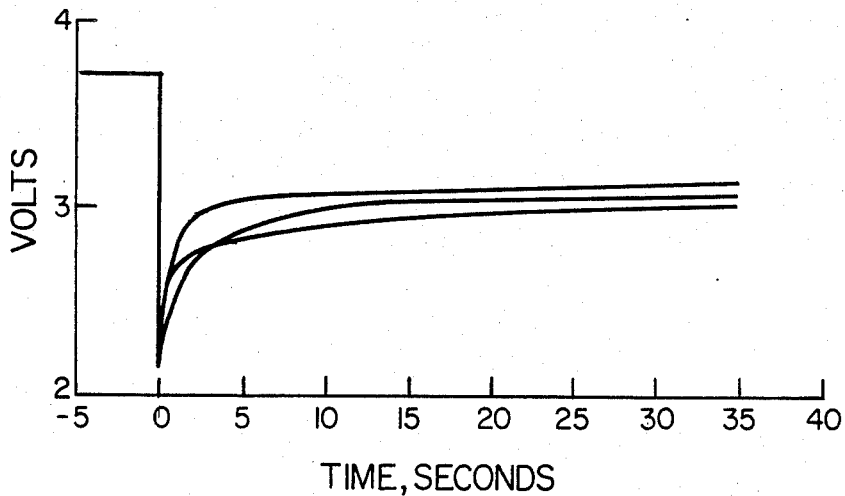
Figure 7:
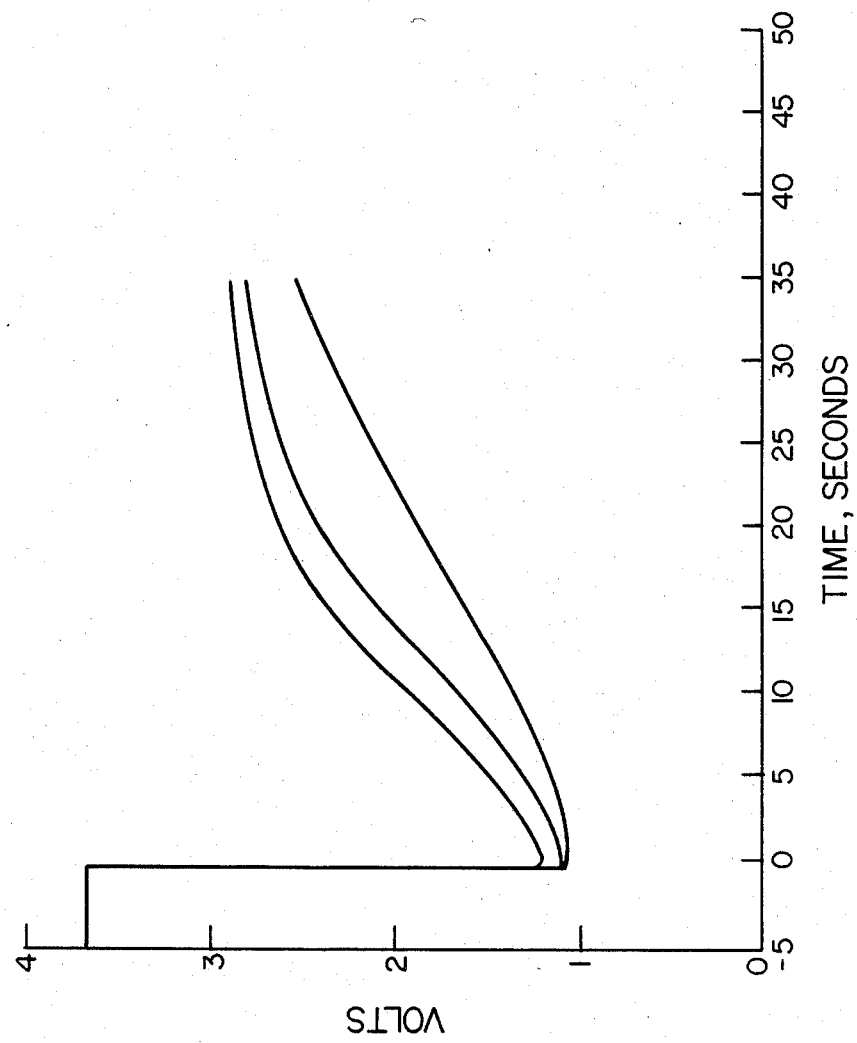
Figure 8:
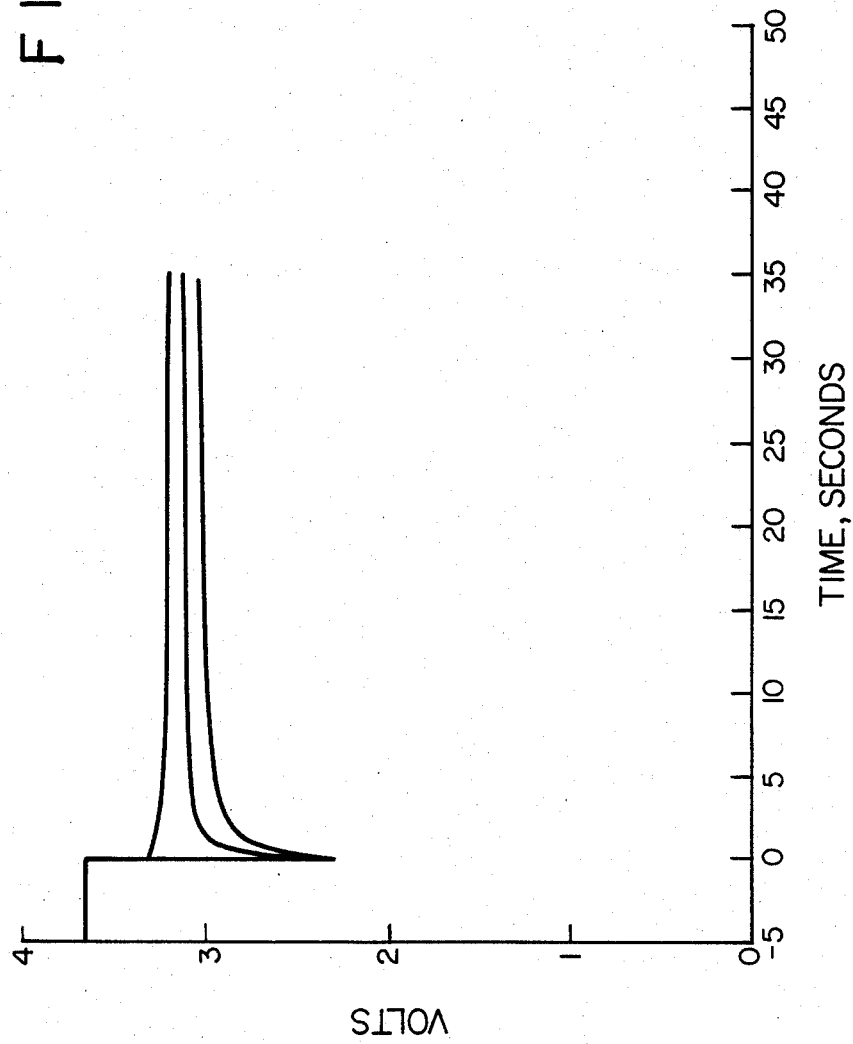

| Cell Lot | Storage Temp. | Additive | [1]Vinyl Polymer Additive | Voltage vs. Time Data |
|---|---|---|---|---|
| *1 | 21° C. | — | — | FIG. 1 |
| *2 | 71° C. | — | — | FIG. 2 |
| *3 | 21° C. | 1 M $BCl_3$ | — | FIG. 3 |
| *4 | 71° C. | 1 M $BCl_3$ | — | FIG. 4 |
| *5 | 21° C. | 1 M $BCl_3$ | 0.25 | FIG. 5 |
| *6 | 71° C. | 1 M $BCl_3$ | 0.25 | FIG. 6 |
| **7 | 21° C. | — | — | FIG. 7 |
| **8 | 21° C. | [2]$B_2S_3$ | — | FIG. 8 |

[1]gram per liter of the cathode-electrolyte
[2]solution saturated with $B_2S_3$
*stored for two weeks
**stored for four weeks As evidenced from the data, the $Li/SOCl_2$-1.5M $LiAlCl_4$ control cells after two weeks storage at 71° C. displayed a voltage of only about 1.5 to 2.5 volt after 35 seconds on the 75-ohm load in contrast to cells of the same system containing 1M $BCl_3$ which displayed voltages of 2.2 to 2.8 after 35 seconds. In two cells from lot 2, the voltage after 35 seconds was only between 1.5 and 1.6 volts which was substantially lower than the lowest performing cell in lot 4 which was 2.2 volts after 35 seconds. Cells of the same system containing 1M $BCl_3$ and 0.25 g/l of the vinyl polymer displayed voltages of 2.8 to 3.0 volts within 4 seconds under the same test conditions.

FIGS. 7 and 8 show that the additive $B_2S_3$ reduced the voltage delay of cells after being stored at 21° C. for four weeks compared to identical cells but not containing $B_2S_3$ and which were also stored for four weeks at 21° C.

What is claimed:

1. In a nonaqueous cell employing an active anode and a cathode-electrolyte solution, said cathode-electrolyte solution comprising a non-boron containing solute dissolved in a liquid active cathode, the improvement wherein the cathode-electrolyte solution contains at least one additive selected from the group consisting of boron trichloride, boron tribromide, boron sulfides, boron oxide, lithium borates and lithium borides, in an amount sufficient to alleviate initial voltage delay of the cell when discharged.

2. The nonaqueous cell of claim 1 wherein the cathode-electrolyte solution contains between about 0.01 mole and about 1.5 moles of the additive per liter of the cathode-electrolyte.

3. The nonaqueous cell of claim 1 wherein the cathode-electrolyte solution contains between about 0.1 mole and about 1.0 mole of the additive per liter of the cathode-electrolyte.

4. The nonaqueous cell of claim 2 or 3 wherein the additive is selected from the group consisting of boron trichloride, boron tribromide and boron sulfides.

5. The nonaqueous cell of claim 2 or 3 wherein the additive is selected from the group consisting of $BCl_3$, $BBr_3$, $B_2S_3$, $B_2O_3$, $LiBO_2$, $Li_2B_4O_7$, $LiB_2$ and $LiB_{12}$.

6. The nonaqueous cell of claim 1 wherein the cathode-electrolyte contains a vinyl polymer in an amount of at least 0.05 gram per liter of the cathode-electrolyte.

7. The nonaqueous cell of claim 2 wherein the cathode-electrolyte contains a vinyl polymer in an amount of at least 0.075 gram per liter of the cathode-electrolyte.

8. The nonaqueous cell of claim 1 wherein the additive is boron trichloride in an amount of between about 0.75 and about 1.0 mole per liter of the cathode-electrolyte and wherein the cathode-electrolyte contains a vinyl polymer in an amount of about 0.25 gram per liter of the cathode-electrolyte.

9. The nonaqueous cell of claim 6, 7 or 8 wherein the vinyl polymer is selected from the group consisting of homopolymers of vinyl or vinylidene chloride, and copolymers containing vinyl chloride or vinylidene chloride having at least one monomer copolymerized therein selected from the group consisting of vinyl esters, dibasic acids, diesters of dibasic acids and monoesters of dibasic acids.

10. The nonaqueous cell of claim 1 or 6 wherein the cathode-electrolyte contains at least one liquid selected from the group consisting of thionyl chloride, sulfuryl chloride, phosphorous oxychloride, thionyl bromide, chromyl chloride, vanadyl tribromide, selenium oxychloride, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride and liquid $SO_2$ and the anode is selected from the group consisting of lithium, sodium, calcium, potassium, and aluminum.

11. The nonaqueous cell of claim 1 or 6 wherein the anode is lithium and the liquid cathode is thionyl chloride.

12. The nonaqueous cell of claim 1 or 6 wherein the anode is lithium and the liquid cathode is sulfuryl chloride.

13. The nonaqueous cell of claim 1 or 6 wherein the solute is $LiAlCl_4$; the cathode electrolyte is thionyl chloride; and the anode is lithium.

14. In a nonaqueous cell employing an active anode and a cathode-electrolyte solution, said cathode-electrolyte solution comprising a non-boron containing solute dissolved in a liquid active cathode, the improvement wherein the cathode-electrolyte solution contains a vinyl polymer additive and at least one boron-containing additive selected from the group consisting of compounds of boron with elements from Periodic Group VIA and VIIA, and lithium boron compounds, to alleviate initial voltage delay of the cell when discharged.

15. The nonaqueous cell of claim 14 wherein the cathode-electrolyte solution contains between about 0.01 mole and about 1.5 moles of the boron-containing additive per liter of the cathode-electrolyte solution.

16. The nonaqueous cell of claim 14 wherein the cathode-electrolyte solution contains between about 0.1 mole and about 1.0 mole of the boron-containing additive per liter of the cathode-electrolyte solution.

17. The nonaqueous cell of claim 15 or 16 wherein the boron-containing additive is selected from the group consisting of boron halide and boron sulfide compounds.

18. The nonaqueous cell of claim 15 or 16 wherein the boron-containing additive is selected from the group consisting of $BCl_3$, $BBr_3$, $B_2S_3$, $B_2O_3$, $LiBO_2$, $Li_2B_4O_7$, $LiB_2$, and $LiB_{12}$.

19. The nonaqueous cell of claim 14 wherein the vinyl polymer additive is present in the cathode-electrolyte solution in an amount of at least 0.05 gram per liter of the cathode-electrolyte solution.

20. The nonaqueous cell of claim 15 wherein the vinyl polymer additive is present in the cathode-electrolyte solution in an amount of at least 0.075 gram per liter of the cathode-electrolyte solution.

21. The nonaqueous cell of claim 14 wherein the boron-containing additive is $BCl_3$ in an amount of between about 0.75 and about 1.0 mole per liter of the cathode-electrolyte solution and wherein the vinyl polymer additive is present in the cathode-electrolyte solution in an amount of about 0.25 gram per liter of the cathode-electrolyte solution.

22. The nonaqueous cell of claim 14, 19, 20 or 21 wherein the vinyl polymer is selected from the group consisting of homopolymers of vinyl or vinylidene chloride, and copolymers containing vinyl chloride or vinylidene chloride having at least one monomer copolymerized therein selected from the group consisting of vinyl esters, dibasic acids, diesters of dibasic acids and monoesters of dibasic acids.

23. The nonaqueous cell of claim 14 or 19 wherein the cathode-electrolyte contains at least one liquid selected from the group consisting of thionyl chloride, sulfuryl chloride, phosphorous oxychloride, thionyl bromide, chromyl chloride, vanadyl tribromide, selenium oxychloride, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride and liquid $SO_2$ and the anode is selected from the group consisting of lithium, sodium, calcium, potasium and aluminum.

24. The nonaqueous cell of claim 14 or 19 wherein the anode is lithium and the liquid cathode is thionyl chloride.

25. The nonaqueous cell of claim 14 or 19 wherein the anode is lithium and the liquid cathode is sulfuryl chloride.

26. The nonaqueous cell of claim 14 or 19 wherein the solute is $LiAlCl_4$; the cathode electrolyte is thionyl chloride; and the anode is lithium.

* * * * *